United States Patent Office 2,710,234
Patented June 7, 1955

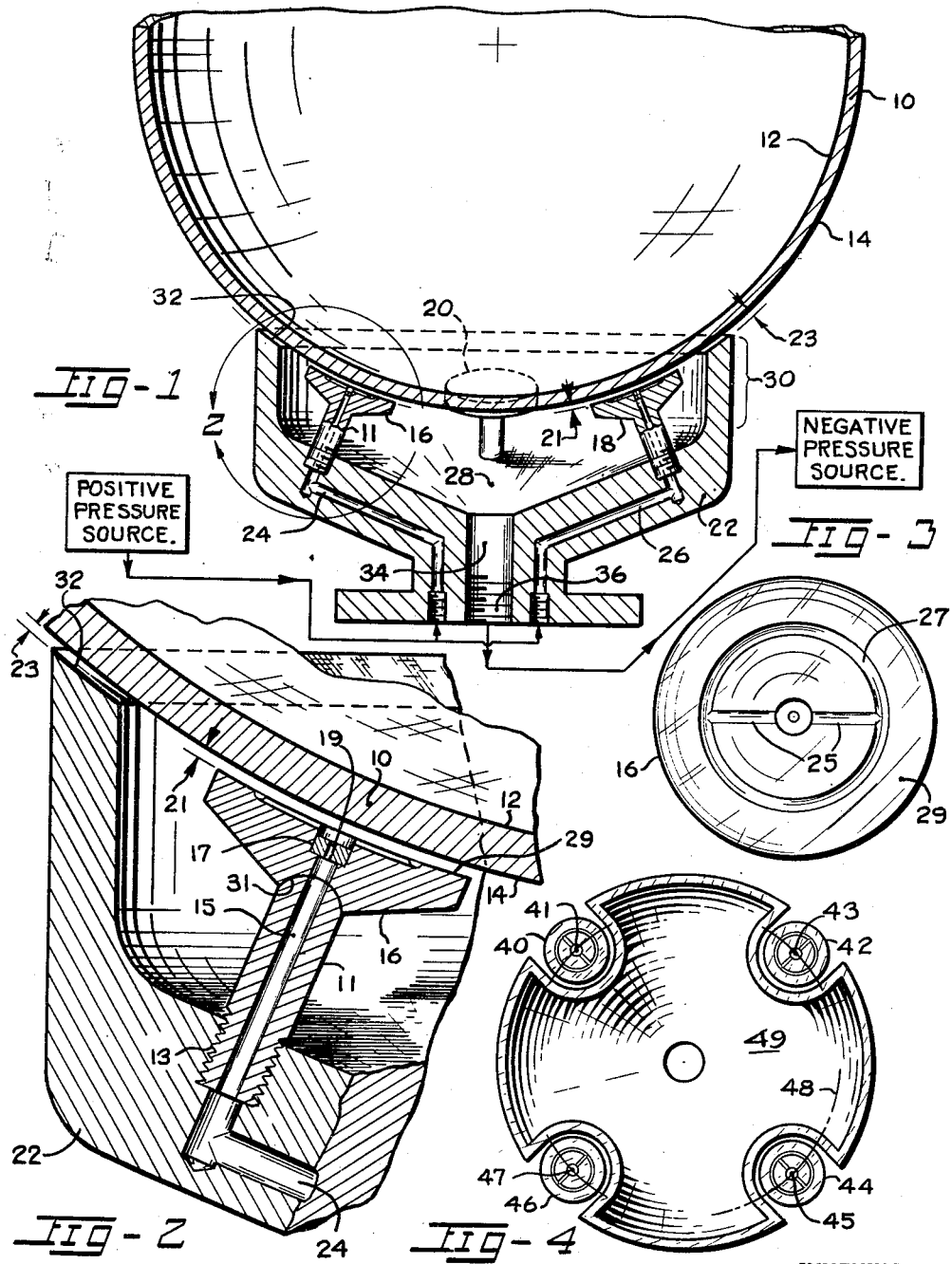

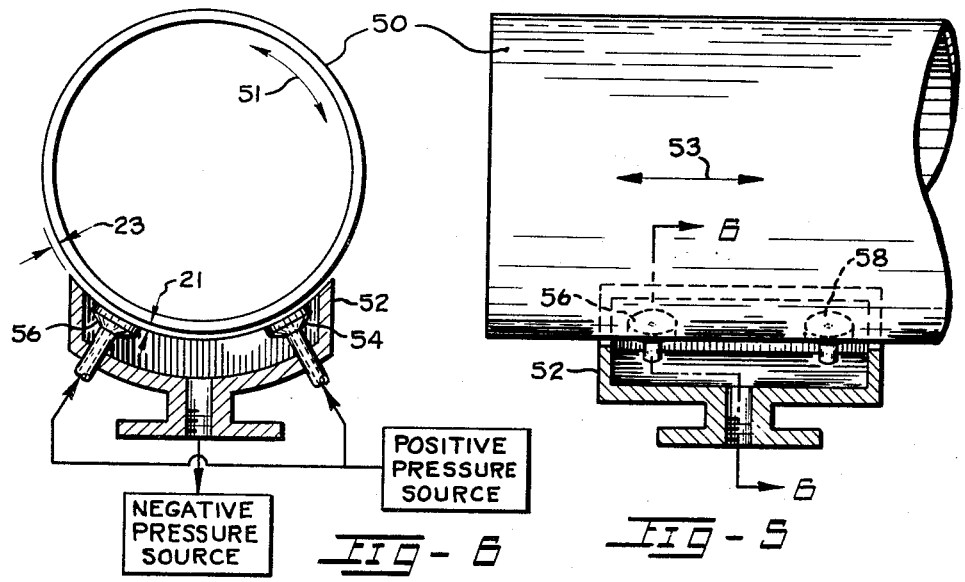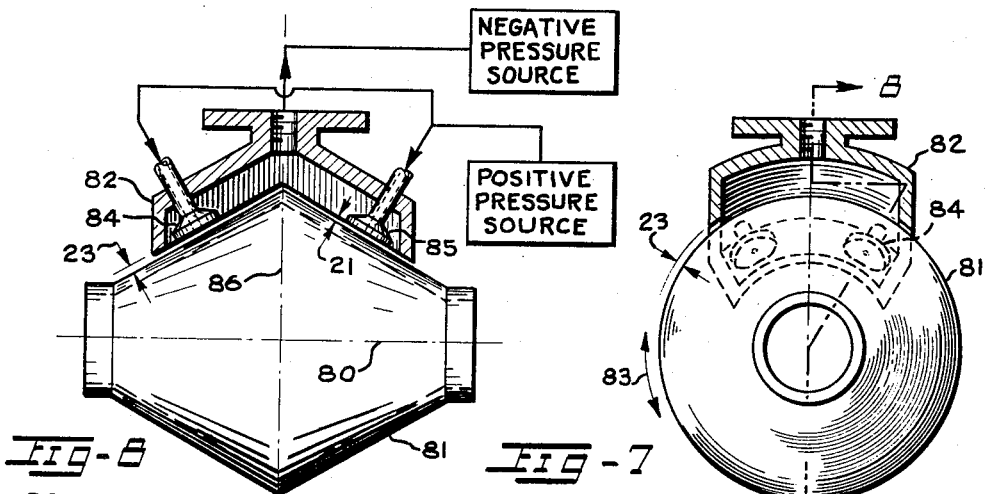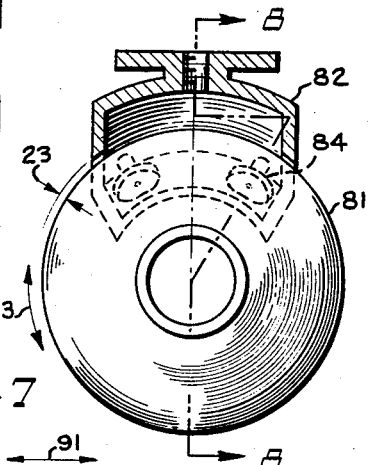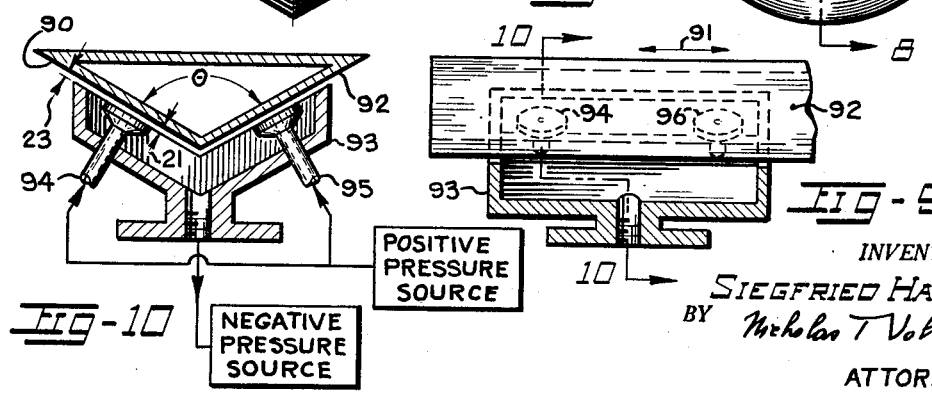

2,710,234

FLUID-BEARING MOUNT

Siegfried Hansen, Los Angeles, Calif., assignor, by mesne assignments, to Hughes Aircraft Company, a corporation of Delaware Application May 22, 1950, Serial No. 163,359

1 Claim. (Cl. 308—9)

This invention relates to fluid bearings, and more particularly to fluid-bearing mounts having different types of possible movements.

The invention will be disclosed in connection with air as a fluid medium; however, it is to be understood that other fluid media, such as nitrogen, oil or water may be used.

This type of bearing is primarily adapted to the support of instruments where low friction is of importance. In this type of application the bearing is utilized as the sole support of a stabilized platform, said platform being accurately balanced with respect to the center of rotation of the bearing and being driven to the stabilized position by some form of torque or thrust motor.

The air bearings per se are well known in the art, and have been used in the past for supporting, with minimum amount of friction, instrument shafts and spherical mounts. In the latter case the mounting platform is rigidly attached to the sphere and the sphere itself has, as a rule, six air pads so distributed over the surface of the sphere that there are four air pads in one plane spaced 90° from each other around the circumference of the sphere, and two additional pads in a line perpendicular to the first plane. Thus, the six pads are uniformly distributed over the entire surface of the sphere, so that they are capable of resisting any change in gravitation or acceleration forces acting on the sphere.

This type of mounting provides very stable mechanical support but it has its limitations. The degree of angular rotation of the sphere is restricted to a very large extent because the angle which exists between the platform supports which are rigidly attached to the sphere, and the aid pads, is less than 40°. Accordingly, the rotational freedom of the sphere and of the platform is restricted, which limits the usefulness of this type of support.

One embodiment of the invention discloses a fluid-bearing mount furnishing a much greater angular freedom of rotation by concentrating the sphere supporting structure to a small area of the sphere. In this embodiment of the invention, the rotational movement is in any direction about the center of the sphere.

In another embodiment of the invention, the fluid-supported structure has only a rotational movement about the axis of a cylinder while still in another embodiment the rotational movement is combined with longitudinal movement parallel to the axis of the cylinder. Finally, there is an embodiment which permits only longitudinal movement parallel to the longitudinal axis of the supported member.

The first embodiment of the invention discloses an air-supported sphere, or a hemisphere, in which the air pads are brought angularly much closer to each other than in the structures known to the prior art and, moreover, the number of the air pads, if so desired, could be reduced to three as compared to six air pads used in the prior art. Such structure permits an increase in the angle of rotation of the sphere and of any equipment mounted on such sphere. Such mounting offers many advantages over the prior art since there are many applications of such mounts in which the desired angle of rotation is of the order of 100°.

Besides accomplishing the above-mentioned advantage, the disclosed structure also makes it possible to obtain concentric mounting of optical elements, or any other elements which are to be supported by such structure, with the result that the rotational geometry of such arrangement is simplified.

To obtain these advantages, the disclosed fluid-bearing mount provides a plurality of air pads which furnish suitable support when the sphere is in such a position as to exert positive pressure on the air pads. This is accomplished by discharging air streams under sufficiently high positive pressure to exert the necessary air pressure on those portions of the surface of the hemisphere which are in direct proximity of the air pads. When the entire system is in mechanical equilibrium, the positive air pressure exerted on the sphere, by the air flowing through the air-gaps between the air pads and the outer, convex surface of the sphere is equal to the pressure exerted by the sphere itself on the air in the gaps. In other words, the action of the air pressure is equal to the reaction of the sphere due to the combined forces of gravity and acceleration, and the sphere finds itself in the state of continuous, stable equilibrium by being supported at this time by the positive air pressure. The "positive air pressure" term, as used here, means pressure above ambient pressure, i. e., it is a gauge pressure and may be of the order of 90 pounds per square inch. Such is the action of the disclosed invention when the sphere is on top of the air pads, which is the position disclosed in Fig. 1 of the drawings. However, occasions may arise when the position of the sphere is reversed, with respect to the air pads or in some intermediate position so that the air pads are on top of the sphere or partly so. When this is the case, the sphere would immediately fall off or leave the support, since the thrusts exerted by the pads and the force of gravity would act in the same direction. In order to prevent this, the invention provides a "suction cup" element which retains the sphere in proper position with respect to the element because of existing partial vacuum within the element, which in this case has a geometric configuration of a cup. This creates differential pressure between the outer surface engaged by the cup and the inner surface of the sphere, which is exposed to atmospheric or ambient pressure.

This partial vacuum in the cup will be called in the specification, for brevity, a negative pressure, which is a pressure below ambient pressure, the ambient pressure itself being above or below atmospheric pressure in some applications. Moreover, since the medium used for supporting the mount may be either air, other gases or fluid, the latter term, i. e., "fluid," will be considered as being generic for both liquid and gaseous states of matter used within the mechanism of the mount. The remaining fluid-bearing mounts disclose applications of the above principles to a shaft, conjugate truncated cones and, finally, to two flat surfaces of a V-shaped member, or a member having triangular cross-section.

It is therefore one of the principal objects of this invention to provide a fluid-bearing mount utilizing differential pressure as the bearing medium in which the bearing area is confined to a limited area of the mount, thus giving a large degree of rotational freedom in any direction to the entire mount, or greater freedom of longitudinal movement.

It is an additional object of this invention to provide fluid-bearing spherical, cylindrical, conical, or flat surface mounts, all of which utilize both positive and negative pressures of fluid-dynamically supporting the load on the mount in any position with respect to the force of gravity, or any other combination of forces.

Still another object of this invention is to provide a fluid-bearing spherical mount in which the sphere-supporting structure is confined to an area which spans a solid angle less than $2\pi$ steradians.

It is also an object of this invention to provide a fluid-bearing spherical mount in which the periphery of the sphere-supporting structure defines substantially a circle whose diameter is less than the diameter of the sphere or hemisphere supporting the load.

An additional object of this invention is to provide fluid-bearing mounts comprising a first element used for supporting an external load, and a second element coupled to the first element and a new method of fluid-dynamically coupling the elements by utilizing positive and negative pressures, the two pressures being independent of each other, and the positive pressure exerted on the surface of the load supporting element increasing rapidly with the approach of this surface to the air pads or fluid pads furnishing the positive pressure, part of the positive pressure drop taking place across the orifices within the pads and the remaining pressure drop taking place in the varying air-gaps or fluid-gaps existing between the air pads and the outer surface of the load supporting element operatively engaged by the pads, and a suction cup connected to the source of negative pressure.

It is also an object of this invention to provide the novel features which I believe to be characteristic of the invention, as set forth particularly in the appended claim. The invention itself, however, both as to its organization and method of operation, together with further objects and advantages thereof, may best be understood by reference to the following description taken in connection with the accompanying drawings in which:

Fig. 1 is a vertical cross-sectional view of the fluid-bearing spherical mount which is capable of rotational movement in any direction about the center of the sphere;

Fig. 2 is an enlarged vertical cross-sectional view of the mount defined by a circle 2 in Fig. 1;

Fig. 3 is a plan view of an air pad or a fluid pad;

Fig. 4 is a plan view of a modified version of the fluid-bearing spherical mount;

Fig 5 is a side elevational view of a mount having a rotational movement about the axis of the cylinder and a longitudinal movement parallel to the axis of the cylinder, with the supporting mechanism being illustrated in section;

Fig. 6 is an end view of Fig. 5 taken along line 6—6.

Fig. 7 is an end view of conjugate, truncated cones mount having only a rotational movement about the common axis of the cones;

Fig. 8 is a side view of Fig. 7 taken along line 8—8;

Fig 9 is a side view of a mount using flat surfaces which are at an angle with respect to each other, the mount permitting only a longitudinal movement of the support;

Fig. 10 is an end view of Fig. 9 taken along line 10—10 of Fig. 9.

Referring to Fig. 1, a member such as a hollow sphere or hemisphere 10 having an inner surface 12 and an outer optically smooth surface 14 is air-supported by means of the so-called "air pads" or "fluid pads" 16, 18, and 20 visible in the drawing, and a similar fourth pad not visible in the drawing. The pads are preferably circular in form, as illustrated in Fig. 4, where a plan view of the pad surface facing the outer surface 14 of the hemisphere 10 is illustrated. The four air pads are distributed over a limited portion of surface 14 in the manner illustrated in Fig. 1; four pads 40, 42, 44, and 46 are shown in Fig. 4, which presents a modification of the suction cup mounting device of Fig. 1 as discussed later in the disclosure. It is to be noted that centers 41, 43, 45, and 47 of the pads lie on a circle 48, whose diameter is substantially smaller than the diameter of a sphere which they support.

As illustrated on an enlarged scale in Fig. 2, the air pads comprise a supporting stem 11 and an air pad 16. The outer end of stem 11 is threaded at 13, this threaded portion engaging a matching thread in a suction cup 22. The air pads may have a swivel joint 31 which makes the pads self-aligning with respect to the outer convex surface 14 of the sphere 10. The suction cup 22 is provided with four ducts connecting the respective four air pads to a source of compressed air or compressed fluid; only two ducts, ducts 24 and 26, being visible in Fig. 1. These ducts extend into the stems and the air pads in the manner illustrated at 15 in Fig. 2, the stem and the air pad duct 15 being terminated at an orifice 17 having an orifice opening 19. Surface 29 of air pad 16 has a radius equal to the radius of the outer surface 14 of the hemisphere 10, and is ground to optical smoothness, which is also true of the remaining three air pads. Normally, when the compressed air flows through the ducts 24 and 15, it reaches orifice 17 and emerges through the orifice opening 19. It then escapes through a clearance 21 which normally exists between surface 29 of the air pad and outer surface 14 of the sphere.

As indicated in the plan view of the pad in Fig. 3, the pad is provided with radial grooves 25 and a circular groove 27, which are used for furnishing sufficient positive pressure area on the sphere 10 to initially lift the sphere off the pads when the positive fluid pressure is initially supplied.

The suction cup 22 consists of an inner chamber 28 and a cylindrical wall 30 of uniform height terminated in a preferably concave surface 32, whose radius is equal to the radius of the outer surface 14 of the sphere. Surface 32 thus constitutes an annular surface which matches in curvature the outer surface of the sphere in the manner illustrated in Figs. 1 and 2. The inner chamber 28 of the suction cup 22 has a central cut 34, Fig. 1, which is connected to a vacuum pump through a threaded portion 36 of duct 34.

The operation of the mount is as follows: Positive air pressure is supplied to the four ducts, such as ducts 24 and 26, from the compressed air reservoir with the result that there is a constant stream of air through the openings in the orifices, such as opening 19 in orifice 17. Part of the air pressure is lost in the orifice, and the remaining part of the air pressure is lost in clearance 21 between the outer surface 14 of the sphere and surface 29 of the air pad. Neglecting for the present the effect of negative pressure due to the suction cup, that part of the pressure which is lost in clearance 21 must be sufficiently high so as to support the entire sphere, and the load mounted on the sphere, by means of the positive air pressure. Accordingly, it is this positive air pressure exerted on the surface of the sphere that must be equal to the force of gravity of the sphere and its load. When this is the case, the sphere is in equilibrium position with respect to the air pads and the suction cup, and is supported on the air streams flowing through the clearances between the air pads and the outer convex surface of the sphere. If this air pressure is not sufficient to support the sphere, the sphere will begin to approach surface 29, Fig. 2, of the air pad, and therefore clearance 21 between the air pad and the convex surface of the sphere will diminish. When this takes place, the loss of air pressure in orifice 17 and the loss of air pressure in gap 21 will at once redistribute themselves so that the pressure loss across the orifice will be smaller and the pressure loss in gap 21 will be larger. Accordingly, the air pressure on the sphere will increase until it will be capable of supporting the sphere on the air streams through the gaps, such as gap 21. Conversely, if sphere 10, because of some external forces, will recede from the air pads, gap 21 will be increased with the result that less air pressure will be lost in the gap and a larger portion of the total air pressure will be lost in the orifice. Accordingly, the pressure exerted by the air stream on the sphere will be reduced until new equilibrium is established.

The above-mentioned functioning of the air pads and the gap between the air pads and the sphere takes place when the sphere is on top of the air pads and therefore the gravitational force, as well as the differential pressure created by the suction cup has a component which is continuously perpendicular to surface 29 of the air pad. However, the duty cycle of the mount may include a condition when sphere 10 is below the air pads, under which circumstance the force of gravity will act in the opposite direction with the result that if it were not for the suction cup 22, the sphere would at once drop or fall away from the air pads because, in the illustrated mount, the air pads are all concentrated over a relatively small area of the outer surface of the sphere. In order to prevent this, the invention provides the suction cup 22, the inner chamber 28 of which is connected to a vacuum pump through duct 34. Therefore, when the sphere rests on top of the suction cup, in the manner illustrated in Fig. 1, the air pressure exerted by the air stream present in the gaps above the air pads must be equal to the gravitational force exerted by the sphere plus the differential pressure created because of atmospheric pressure exerted on the inner surface 12 and partial vacuum over that portion of surface 14 which is surrounded by the suction cup 22. Accordingly, the lifting or supporting effect of the air pads must be sufficiently large so as to oppose not only the gravitational force and any additional forces which may be present due to acceleration, but also the differential pressure. This is obtained by the decrease in gap 21 to the point at which the above equality is established. In one extreme case, the practically entire available pressure may be lost in the air gap and hardly any in the orifice; in the other extreme case, practically the entire pressure is lost in the orifice. This is the example described below.

When the suction cup and the air pads are above the sphere, the force of gravity will tend to separate the sphere from the support with the result that gap 21 will be increased and, as a consequence, hardly any pressure will be exerted by the air pads on the sphere since practically the entire positive pressure drop will take place across orifice 17. An increase in the dimensions of gap 21 will be accompanied by the increase in the dimensions of gap 23, with the result that more air will be reaching chamber 28 of the suction cup. However, the capacity of the vacuum pump is such that no significant change in the vacuum, or negative pressure existing in chamber 28 will take place. The dimensions of the suction cup and the capacity of the vacuum pump must be proportioned so as to furnish sufficient negative pressure supporting the entire weight of the sphere and its load when the suction cup is above the sphere.

It should be noted that the combination of the sphere, and any load mounted on the sphere or hemisphere will function in the above-mentioned manner, without any additional compensating means, when the center of gravity is at the center of the sphere. It is under such circumstances that the described support functions in the manner outlined above. If the center of gravity of the supported mass does not coincide with the geometric center of the sphere, a rotational couple will be set up. Since no friction exists between the sphere and the support (for all practical purposes), it is obvious that such couple would rotate the sphere until a point of equilibrium would be reached. When the center of gravity does not coincide with the center of the sphere, it is possible to provide additional reaction motors for counter-balancing the effect of such couple. However, when the geometry of the equipment is such that the center of the sphere and the center of gravity coincide, then the lever arm of such couple is always equal to zero and, therefore, no rotation could be produced by any rotational displacement of the sphere with respect to the support.

Fig. 4 illustrates a modification of the support portion of the fluid-bearing mount. In this case, the air pads 40, 42, 44, and 46 are mounted outside the suction cup 49. The advantage of this configuration resides in the fact that the vacuum pump need not have an additional capacity for removing the air supplied by the air pads, since the air pads discharge into the ambient atmosphere rather than into the suction cup. Therefore, the capacity of the vacuum pump may be somewhat smaller. The obtainable reduction in the capacity of the vacuum pump is somewhat offset by the increase in the length of the gap between the suction cup and the sphere. The functioning of the air pads and of the suction cups is made completely independent of each other in the sense that the air pads do not discharge into the suction cup as in Fig. 1.

It is to be noted here once more that the vacuum pump, or the source of negative pressure should have sufficient capacity to make the operation of the suction cup and of the air pads independent of each other in either case, i. e., in Figs. 1 and 2, as well as Fig. 4.

Figs. 5 and 6 disclose applications, structures, and methods outlined in connection with Figs. 1 through 4 to a support in which the supported rotational member is a cylinder 50. The supporting structure itself consists of a cylindrical suction cup 52 and a plurality of air pads, such as pads 54, 56, and 58, the fourth air pad not being visible in the illustrated figures. As in the previous figures, suction cup 52 is connected to the source of negative pressure and the fluid pads are connected to the source of positive pressure. The surface of the fluid pads, which is adjacent to cylinder 50, is concave to match the outer convex cylindrical surface of cylinder 50, the same being true of suction cup 52. Accordingly, the suction cup, as well as the fluid pads, form only extremely narrow fluid gaps between the outer surface of the cylinder and the surfaces of the supporting structure facing the cylinder. This type of support permits rotation of the shaft around its axis and it also permits lateral or longitudinal movement of the shaft in either direction, as illustrated by arrows 51 and 53. Although the supporting structure is illustrated at the bottom of cylinder 50 in both figures, it is possible to have an angular displacement of the supporting structure with respect to the direction of the force of gravity because of the use of the positive and the negative pressures.

Figs. 7 and 8 illustrate the application of the disclosed principles to conjugate truncated cones with the bases of the cones being conjugate with respect to each other. Examination of this structure reveals, at once, that the structure of this type would have only rotational movement, indicated by arrows 83, about the common axis 80 of the two cones. It is to be understood that the supporting structure, including suction cup 82 and two or four or a larger number of pressure pads such as pads 84, 85, etc., should be symmetrically arranged with respect to axis 86 in order to balance the forces exerted by the support on mount 81.

Figs. 9 and 10 disclose application of the same principles to flat surfaces such as surfaces 90 and 92, which are at an $\angle \theta$ with respect to each other. Angle $\theta$ may vary up to 180°. In this instance, the mount will resolve itself to a single flat surface and the arrangement will permit two degrees of translation and one of rotation.

While the invention discloses four air pads and a single suction cup, it is to be understood that the invention is not limited to the illustrated configuration of elements since it is obvious that the same results may be obtained by decreasing the number of air pads and by increasing the number of suction cups. Moreover, the positive pressure ducts may be incorporated in wall 30 of the suction cup with the result that positive pressure gap in such configuration becomes gap 23 illustrated in Fig. 2.

What is claimed is:

A fluid-bearing mount comprising: a member having a convex surface; a suction cup having an annular concave edge surface matching said convex surface and surrounding a portion thereof; a source of negative fluid pressure connected to said cup for creating a negative pressure on the surrounded portion of said convex surface; a plurality of fluid pads mounted within said suction cup, said pads having concave surfaces matching said convex surface and in juxtaposition thereto; and a source of positive fluid pressure connected through said suction cup to said fluid pads for applying positive fluid pressure on said surrounded portion of said convex surface to establish a flow of fluid between said convex and concave surfaces, said positive fluid pressure supporting said member when said member is above said pads and cup and said negative pressure supporting said member when said member is below said pads and cup.

References Cited in the file of this patent

UNITED STATES PATENTS

| | | |
|---|---|---|
| 466,645 | Wood | Jan. 5, 1892 |
| 1,906,715 | Penick | May 2, 1933 |
| 2,049,343 | Warren | July 28, 1936 |
| 2,086,896 | Carter | July 13, 1937 |
| 2,544,720 | Ospina-Racines | Mar. 13, 1951 |
| 2,695,198 | Brugger | Nov. 23, 1954 |
| 2,695,199 | Blizard | Nov. 23, 1954 |